March 16, 1965  R. L. WILSON  3,173,342
DIAPHRAGM AND METHOD OF MAKING

Filed May 10, 1962  2 Sheets-Sheet 1

INVENTOR.
Richard L. Wilson
BY
*A. A. Steinmiller*
Attorney

March 16, 1965  R. L. WILSON  3,173,342
DIAPHRAGM AND METHOD OF MAKING
Filed May 10, 1962  2 Sheets-Sheet 2

INVENTOR.
Richard L. Wilson
BY
*A. A. Steinmiller*
Attorney 3,173,342
DIAPHRAGM AND METHOD OF MAKING
Richard L. Wilson, Trafford, Pa., assignor to Westinghouse Air Brake Company, Wilmerding, Pa., a corporation of Pennsylvania
Filed May 10, 1962, Ser. No. 194,754
3 Claims. (Cl. 92—103)

This invention relates to flexible diaphragms and the method of construction thereof.

Many of the industrial diaphragms such as are now used in fluid pressure operable devices, for example, comprise two outer layers of resilient material, such as rubber, with an inner layer of reinforcing fabric molded between the rubber layers. The reinforcing fabric imparts greater strength to the diaphragm without sacrificing flexibility and therefore permits such a diaphragm to be subjected to higher fluid pressures than if it were made solely of rubber of the same thickness.

Certain types of annular diaphragms heretofore known are molded with a curved cross-sectional shape or with an annular convolution to provide sufficient material for a reciprocable piston member or follower secured to the central portion of the diaphragm to move axially for appreciable distances. Diaphragms of this type made according to heretofore known methods have not proved altogether satisfactory because of their undesirably limited service life. In other words, constant and repeated flexure of the diaphragm by reciprocation of the diaphragm follower has resulted in failure of the diaphragm by splitting or rupture of the rubber layers.

In studying methods and means of lengthening the service life of diaphragms of this type, it was discovered that existing types of fabric reinforced diaphragms, as made by methods heretofore known, were characterized by an irregularity of the fabric layer, that is, the fabric layer varied in depth from a central or mid position to a position close to either of the outer surfaces of the diaphragm. In a diaphragm having substantially an S-shaped cross-sectional form, this may be explained by the fact that the reinforcing fabric has a tendency, due to the flow of the rubber in taking shape during the vulcanizing or molding process, to assume its natural flat state rather than maintain a position uniformly spaced midway between the curved molding surfaces of the mold, the result being that the reinforcing fabric shifts closer to the outside surface of the diaphragm at the inside of the curves rather than being evenly disposed midway between the two outer surfaces of the diaphragm.

A diaphragm having the reinforcing fabric close to the surface, particularly adjacent the point of flexure, is susceptible to rapid wear and, therefore, to leakage and damage in that pressurized fluid may possibly enter into the fabric through a small break in the outer rubber surface on the side on which said fluid pressure is acting, follow the fabric fibers lengthwise through the diaphragm to where the fabric is near the surface on the other side and possibly cause the thin layer of rubber thereover to balloon and rupture, thereby destroying the diaphragm. Such damage, of course, is more apt to occur when the diaphragm is in a flexed or stressed condition and is subjected on one side to a relatively high pressure while the other side is at atmospheric pressure, because the diaphragm is thus subjected concurrently to the flexing stress as well as the stress placed thereon by the pressure of fluid.

It was concluded therefore that the lack of uniform depth to which the fabric layer was embedded was a factor contributing to the shortening of the service life of the diaphragm.

Accordingly, the principal objective of the invention is to devise a diaphragm and method of making it which will insure a uniform depth of the fabric layer throughout the diaphragm, thereby to enable the diaphragm to have a greatly increased service life compared to diaphragms heretofore known.

According to the invention, the diaphragm is molded in a conical shape so that, in its free or unstressed state, the diaphragm is of truncated conical shape. This insures that the central layer of fabric molded in place between two outer layers of rubber remains uniformly spaced midway between the outer surfaces of the diaphragm during the molding process and, therefore, in the finished product.

In making the diaphragm, an annular flat blank consisting of two layers of rubber sheet with an intervening layer of fabric is placed in the mold and during the molding process assumes a conical shape. The flow of the rubber during the molding process will not, however, affect the position of the fabric which will therefore remain evenly and uniformly spaced between the two outer layers of rubber, thereby resulting in a diaphragm of uniform strength throughout and which provides maximum protection against leakage or rupture and, therefore, a longer service life. Upon installation, the diaphragm is literally turned inside out so that the diaphragm retains a uniform resistance to flexure over a wide range of operating movement of the follower.

The diaphragm embodying the invention and its method of manufacture is illustrated in the accompanying drawings wherein.

*Description*

Figure 1:
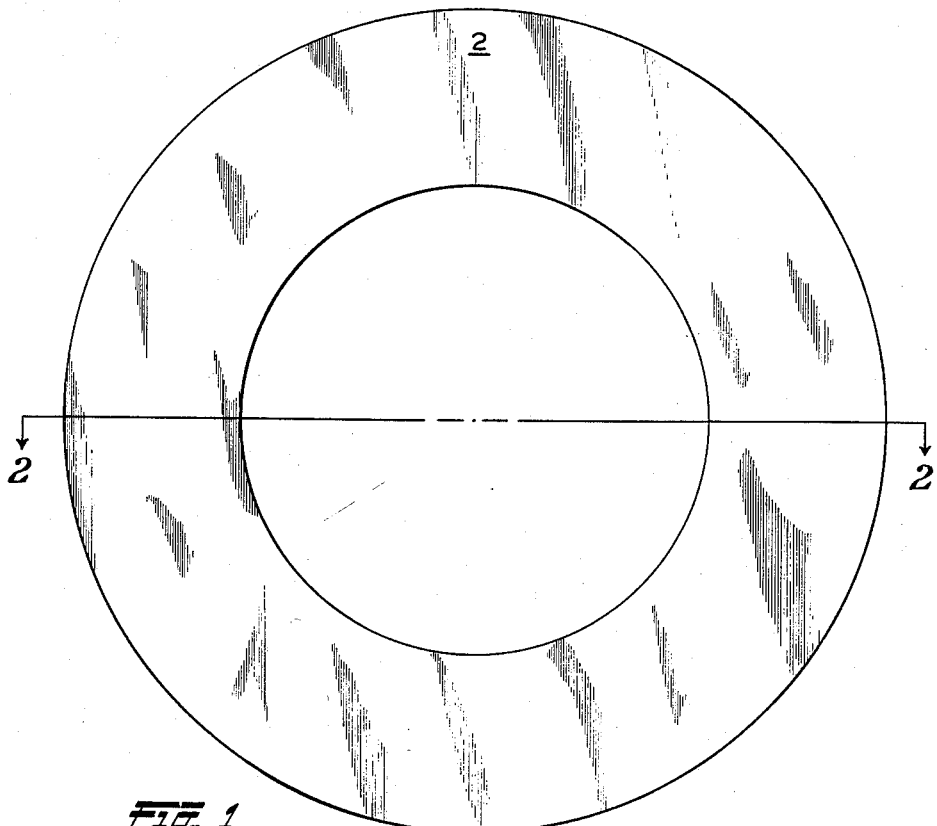
FIG. 1 is a horizontal view of a preformed diaphragm blank, from which a diaphragm is made, before being placed in a mold.
Figure 2:
FIG. 2 is a sectional view of the preformed diaphragm blank taken along line 2—2 of FIG. 1.
Figure 4:
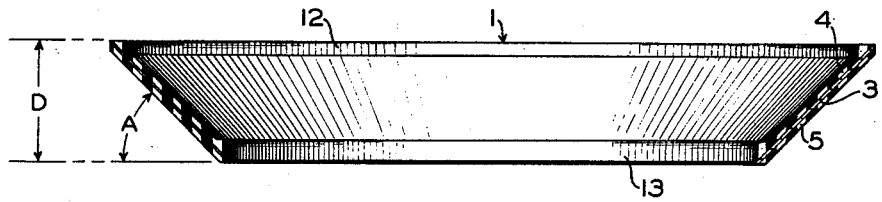
FIG. 4 is a sectional view of a diaphragm made according to the invention showing the construction and shape thereof when in a free or non-flexed state.
Figure 5:
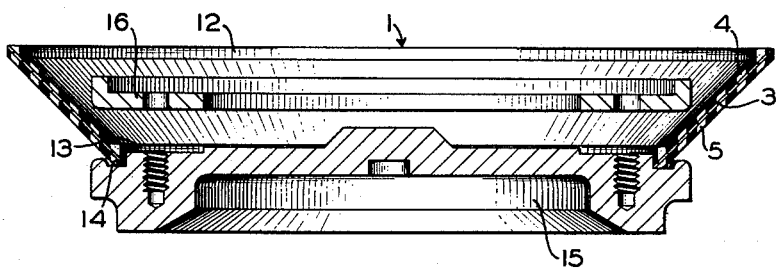
FIG. 5 is a sectional view illustrating an initial step in securing the type of diaphragm shown in FIG. 4 to a piston follower.

A finished diaphragm 1 of truncated conical form and embodying the invention is shown in FIG. 4 in its free unstressed state before being installed in any device adapted to use such a diaphragm. The diaphragm 1 is formed or molded in a mold (not shown) consisting of a female portion having an internal surface contour conforming to the outer surface contour of the diphragm 1 and a complementary male portion having an external surface contour conforming to the inner surface contour of said diaphragm. The diaphragm 1 is formed from a flat washer-shaped blank 2, as shown in FIGS. 1 and 2, said blank being stamped out of a flat sheet of material consisting of an inner layer of reinforcing fabric 3, such as woven nylon, pressed between two outer layers 4 and 5 of resilient material such as rubber in an uncured or unvulcanized state. The outer rubber layers 4 and 5 are of similar and uniform thickness so that the inner fabric layer 3 is uniformly spaced from the outer surfaces of the rubber layers.

The blank 2 is placed over the female portion of the mold and the male portion is then mated therewith under suitable prescribed pressure, such as by a hydraulic press, while the mold is kept constantly heated in suitable manner to a prescribed temperature for curing the rubber. As the two portions of the hot mold are brought together, the portion of the blank 2 adjacent to the inner periphery thereof is compressed to some degree to a diameter corresponding to the inner diameter of the finished diaphragm 1, while the portion of said blank adjacent the outer periphery thereof is stretched to some degree to a diameter corresponding to the outer diameter of the finished diaphragm. Incident to the compressing and stretching of blank 2, as above described, whereby it is warped into a dish-like or truncated conical shape, the effect on the fabric layer 3 is that the warp and woof threads of said fabric adjacent the inner periphery are compressed more closely together, while the warp and woof threads adjacent the outer periphery are spread further apart, said spreading and particularly the compressing of the threads, however, being so slight as to not cause the fabric to wrinkle during the molding or vulcanizing process. The rubber layers 4 and 5, of course, when heated, merely flow uniformly between the two portions of the mold while the fabric layer 3 is retained thereby in its midway position therebetween. After the material has remained in the mold, under prescribed pressure and heat, for a suitable length of time required to properly cure the rubber and vulcanize it to the fabric, the result is a diaphragm such as shown in FIG. 4.

Figure 3:
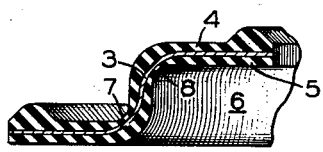
FIG. 3 is a sectional view of a portion of a conventional diaphragm having a so-called S-shaped cross-section.
Figure 8:
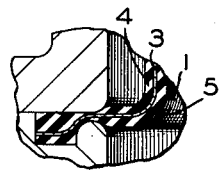
FIG. 8 is a sectional view, on a larger scale, of a portion of the diaphragm assembly shown in FIG. 7.

The method, as above described, of making diaphragms of the form of diaphragm 1 shown in FIG. 4, consistently results in producing a diaphragm with the fabric layer 3 uniformly disposed midway between the outer surface of layers 4 and 5, which, in turn, insures a longer service life for the diaphragm. By way of contrast, a portion of a so-called S-shaped or convolutional diaphragm 6 as made by a heretofore employed method is shown in FIG. 3 in its free or unstressed shape in which it was molded and characterized by convolutions permanently molded therein. The S-shaped diaphragm 6 is also molded from a blank (not shown) constructed similarly to the blank 2. The blank 2, however, is preformed in its uncured state to the convolutional shape by placing it in a cold mold (not shown) having a corresponding shape and then placing it under suitable pressure at atmospheric temperature for a prescribed period of time. The uncured rubber, and therefore, the blank 2, assumes the shape of the mold for a temporary period of time sufficient to retain the preformed shape until said preformed blank is placed in a hot mold under pressure for vulcanizing it.

Due to the fact that the blank 2, and therefore the fabric layer 3, of the convolutional diaphragm 6 is placed in the hot mold in convoluted form, there is an inherent tendency of said fabric to assume its naturally flat or non-convoluted shape. Hence, during the vulcanizing process when flow of rubber of the two outer layers 4 and 5 occurs to assume the form of the mold, such flow, in addition to the inherent tendency in the fabric layer 3 itself to flatten out, helps in causing said fabric layer to shift from its midway position between the outer surfaces. When the molding process is completed, the fabric layer 3 is found to have shifted closer to the external surfaces of the diaphragm, particularly at the inner surfaces of the convolutions designated by the reference numerals 7 and 8.

A condition of non-uniform spacing of the reinforcing fabric layer 3 between the outer surfaces of the two layers of rubber 4 and 5, such as illustrated in the diaphragm 6 shown in FIG. 3, is most undesirable in that the diaphragm with such weak areas is susceptible to leakage and possible rupture. Certainly the life of the diaphragm is greatly reduced by a condition such as that illustrated in FIG. 3. When a diaphragm such as the diaphragm 6 is placed in service, the constant flexing during operation usually results in failure of the thin rubber layer at the inner curved surfaces 7 and 8, so that when the diaphragm is subjected to fluid pressure, such pressurized fluid enters the break developed in the thin rubber layer at either 7 or 8, depending on which side said fluid pressure is acting, follows the fibers of fabric layer 3 lengthwise of said fibers through the diaphragm to the thin rubber area on the opposite side of the diaphragm, and causes said thin rubber layer on the opposite side to balloon and rupture, thereby destroying the diaphragm.

Since the method of making a diaphragm of the type shown in FIG. 4 and above described produces a diaphragm with the fabric layer 4 uniformly and equidistantly spaced between the outer surfaces of rubber layers 4 and 5, the destruction of the diaphragm due to weak spots caused by non-uniform spacing of the fabric layer is eliminated and the useful life of the diaphragm is greatly increased. Comparison tests made on the new conical type diaphragm 1 and the older convolutional type 6 have shown the convolutional type to fail almost consistently after approximately 13,000 operating cycles, whereas the conical type diaphragm made according to the present invention was still serviceable after 350,000 operating cycles.

FIGS. 5, 6, 7 and 8 illustrate how the diaphragm 1 is installed in a fluid pressure operable device 11, which may be any suitable device using a diaphragm type piston. The diaphragm 1 is provided with two annular sealing lips or beads 12 and 13 formed integrally on the internal surface of the diaphragm adjacent the larger diameter extremity and the smaller diameter extremity, respectively, of said diaphragm, as viewed in FIG. 4. The smaller diameter of the diaphragm 1 is placed in an annular groove 14 formed adjacent the outer periphery of a piston follower 15 and corresponding in diameter to the diameter of the annular bead 13 on the diaphragm. A clamping plate 16 is secured to the piston follower 15 by a plurality of screws 17 (see FIG. 6) whereby the bead 13 is pressed into and securely confined in the groove 14 to hold the diaphragm 1 fastened at its smaller diameter to said piston follower.

Figure 6:
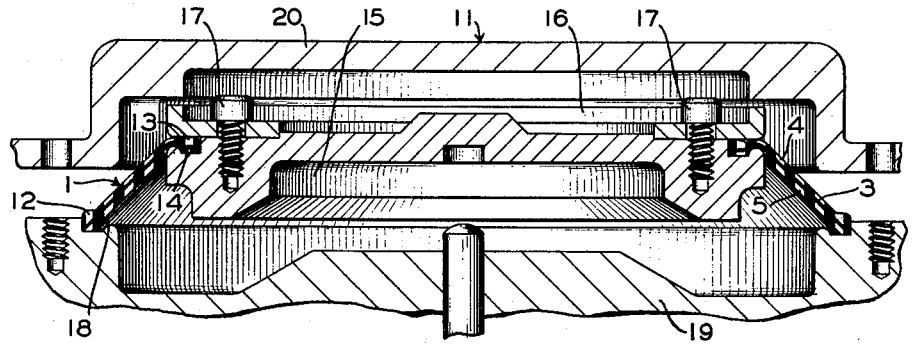
FIG. 6 is a sectional view showing the diaphragm secured to the piston follower and portions of a casing before being clamped together.

After the bead 13 of diaphragm 1 is secured to the piston follower 15, the diaphragm is turned inside out by "peeling" it down over said piston follower, as viewed in FIG. 6, and placing the bead 12 in an annular groove 18 formed adjacent the periphery of a casing section 19 of the device 11, said annular groove being of a diameter corresponding to that of said bead 12. A cap section 20 is secured to the casing section 19 by a plurality of screws 21 (see FIG. 7) whereby the bead 12 is securely confined in the groove 18 to thus secure the diaphragm 1 at its outer periphery or larger diameter between the casing sections 19 and 20.

Figure 7:
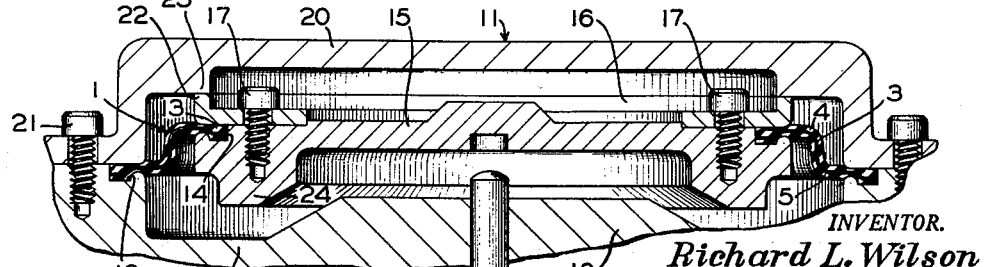
FIG. 7 is a sectional view showing the diaphragm as finally clamped at both its inner and outer peripheries to the piston follower and between the casing sections, respectively, in an operating position.

The diaphragm 1 is now in position for operation, and, as shown in FIG. 7, is seen in one extreme position defined by abutment of an annular shoulder 22 formed on the clamping plate 16 with an annular shoulder 23 formed on the cap section 20, said diaphragm being operable to an opposite extreme position defined by abutment of an annular shoulder 24 formed on the piston follower 15 with a separating wall 25 formed in casing section 19.

As shown in FIG. 4, the wall of the diaphragm 1 is actually formed at an angle of 45° with respect to a plane perpendicular to the axis of said diaphragm, said angle, and therefore the depth of the diaphragm, indicated respectively by the letters A and D in the drawing, being in accordance with the particular over-all travel of the follower 15, as shown, between its two extreme positions above described. It should be understood, however, that should the over-all travel of the follower 15 be increased or decreased without any change in the respective diameters of said follower and/or the casing, the angle A and the depth D would correspondingly be increased or decreased, respectively, to provide the appropriate amount of material in the diaphragm to accommodate the maximum travel of the follower.

In addition to providing a diaphragm with a much longer service life, the particular shape of the diaphragm 1, as seen in FIG. 4, has a further advantage over the particular shape of the S-shaped diaphragm 6, as seen in FIG. 3, in that when the piston follower 15 and, therefore, the diaphragm 1 is in a position midway between the two extreme positions above defined, that is, when the inner and outer peripheries of said diaphragm lie in a common plane, the diaphragm 1 will flex in either direction from said midway position with a uniform rate of resistance and is thus free of inherent biasing action tending to bias the assemblage comprising said follower and said piston toward one or the other of its extreme positions. On the other hand, since the S-shaped diaphragm 5 is provided with natural folds, there is a stronger inherent biasing action tending to bias the piston assemblage in one direction than the other.

Having now described the invention, what I claim as new and desire to secure by Letters Patent, is:

1. The method of making an annular diaphragm, which, in its free unstressed state, is of truncated conical form and which, in its installed position, assumes a form having a convolution between its inner and outer peripheries, which method comprises:

(a) providing a flat washer-shaped blank of continuous and seamless material consisting of an inner layer of reinforcing fabric pressed between two outer layers of unvulcanized rubber material of similar and uniform thickness, (b) placing said blank between mating male and female portions of a mold corresponding in form to said truncated conical form, thereby stretching the blank into conforming conical form prior to the molding operation, and (c) subjecting said male and female mold portions to pressure and heat to cause said blank to be vulcanized permanently into a corresponding truncated conical form while maintaining said several layers of fabric and resilient material in their respective uniformly disposed positions relative to each other and free of convolutions during the vulcanizing operation.

2. An annular flexible diaphragm having a truncated conical form in the free unstressed state in which it is molded, the outer and inner peripheral portions of said diaphragm being movable relative to each other in such manner as to form, in the working condition of the diaphragm, an annular convolution between the inner and outer peripheral portions thereof, said diaphragm being characterized by a single annular continuous and seamless layer of reinforcing fabric embedded between two outer annular continuous and seamless layers of rubber material having uniform thickness and density throughout for providing, in the working condition of the diaphragm, substantially uniform resistance and sensitivity within the limits of operating movement of the diaphragm.

3. An annular flexible diaphragm having a truncated conical form in the free unstressed state in which it is molded, the outer and inner peripheral portions of said diaphragm being movable relative to each other in such manner as to form, in the working condition of the diaphragm, an annular convolution between the outer and inner peripheral portions thereof, said diaphragm being characterized by a single annular continuous and seamless layer of reinforcing fabric embedded between two outer annular continuous and seamless layers of rubber material having uniform thickness and density throughout for providing, under stressed conditions of the diaphragm, substantially uniform sensitivity to fluid pressure exerted on opposite sides thereof within the limits of operating movement of the inner peripheral portion in opposite directions from a neutral position in which the inner and outer peripheral portions are in substantial co-planar registry.

References Cited in the file of this patent

UNITED STATES PATENTS

| 2,147,218 | Reimel | Feb. 14, 1939 |
| 2,185,784 | Corydon et al. | Jan. 2, 1940 |

FOREIGN PATENTS

| 883,295 | Great Britain | Nov. 29, 1961 |